United States Patent
Njiende T. et al.

(10) Patent No.: US 9,356,520 B2
(45) Date of Patent: May 31, 2016

(54) FORWARD CONVERTER WITH MAGNETIC COMPONENT

(71) Applicant: DET International Holding Limited, George Town, Grand Cayman (KY)

(72) Inventors: Hugues Douglas Njiende T., Paderborn (DE); Dieter Heldt, Soest (DE)

(73) Assignee: DET INTERNATIONAL HOLDING LIMITED, George Town Grand Cayman (KY)

( * ) Notice: Subject to any disclaimer, the term of this patent is extended or adjusted under 35 U.S.C. 154(b) by 120 days.

(21) Appl. No.: 13/756,637

(22) Filed: Feb. 1, 2013

(65) Prior Publication Data

US 2013/0201728 A1  Aug. 8, 2013

(30) Foreign Application Priority Data

Feb. 2, 2012  (EP) ..................... 12405013

(51) Int. Cl.
- *H01F 17/04* (2006.01)
- *H02M 3/335* (2006.01)
- *H01F 3/10* (2006.01)
- *H01F 27/30* (2006.01)
- *H01F 27/38* (2006.01)
- *H01F 41/02* (2006.01)
- *H01F 38/40* (2006.01)
- *H02M 1/00* (2006.01)

(52) U.S. Cl.
CPC ............. *H02M 3/335* (2013.01); *H01F 3/10* (2013.01); *H01F 27/306* (2013.01); *H01F 27/38* (2013.01); *H01F 41/02* (2013.01); *H01F 38/40* (2013.01); *H02M 3/33553* (2013.01); *H02M 2001/0064* (2013.01); *Y10T 29/49073* (2015.01)

(58) Field of Classification Search
CPC ......... H01F 3/10; H01F 27/40; H01F 27/306; H01M 41/02; H02M 3/28; H02M 3/337
USPC ........ 363/16–17, 21.02, 21.03, 56.01, 61, 65, 363/21.12; 336/200, 220, 221, 223, 232; 323/222, 224, 225, 235, 259, 282
See application file for complete search history.

(56) References Cited

U.S. PATENT DOCUMENTS

| | | | | |
|---|---|---|---|---|
| 4,257,082 A * | 3/1981 | Brown | ................. | H01H 47/226 361/156 |
| 4,853,668 A * | 8/1989 | Bloom | ......................... | 336/214 |
| 4,864,478 A | 9/1989 | Bloom | | |
| 5,920,473 A | 7/1999 | Sturgeon | | |
| 6,046,664 A * | 4/2000 | Weller | ................. | B23K 9/1006 336/182 |
| 6,980,077 B1 * | 12/2005 | Chandrasekaran | ... | H01F 27/255 336/212 |
| 7,414,507 B2 * | 8/2008 | Giandalia | ........... | H01F 17/0013 336/200 |
| 7,598,837 B2 * | 10/2009 | Gilmartin et al. | ............. | 336/192 |
| 7,719,083 B2 * | 5/2010 | Chang | ................. | H01F 17/0006 257/528 |
| 8,203,855 B2 * | 6/2012 | Shimada et al. | ................ | 363/16 |
| 2011/0063065 A1 * | 3/2011 | Hugues Douglas et al. | .. | 336/170 |
| 2011/0103100 A1 * | 5/2011 | Hosotani | .................... | 363/21.02 |

* cited by examiner

*Primary Examiner* — Rajnikant Patel
(74) *Attorney, Agent, or Firm* — Birch, Stewart, Kolasch & Birch, LLP

(57) ABSTRACT

A forward converter comprises a magnetic component with a transformer and a filter output inductor. Also disclosed is a method for assembly of a forward converter. A first and a second U/UR core are arranged to form an O-core. Windings of the transformer are arranged on the O-core. A bobbin-less U/UR core is arranged to abut the O-core, and windings of a filter output inductor are arranged directly on a body section of the bobbin-less U/UR core. Alternatively, windings of the transformer are arranged on a first section of an E/ER core, and windings of the filter output inductor are arranged directly on a second, bobbin-less section of the E/ER core.

20 Claims, 8 Drawing Sheets

FORWARD CONVERTER WITH MAGNETIC COMPONENT

TECHNICAL FIELD

The invention relates to a forward converter comprising a magnetic component with a transformer and a filter output inductor, and to method steps in the assembly of a forward converter comprising a magnetic component with a transformer and a filter output inductor.

BACKGROUND ART

In power converters with integrated magnetic components and converters with analogous magnetic components, E/ER cores are provided. The term "E/ER core" should be understood as "E core and/or ER core". Windings of a transformer and a filter output inductor are arranged on winding bobbins, which are further arranged on legs of the E/ER core. Switched mode power converters and specifically DC/DC power converters are widely used in telecommunication and commercial systems, for example, and improvements in this field of technology are of high importance, in particular improvements with respect to power density, reduced costs, lowered losses, and/or improved efficiency as well as thermal resistance.

Active clamp forward converters are one of the most appropriate topologies for low to medium power applications, due to its simplicity and its performance in this power range. While the transformer core is optimally used due to symmetrical excitation in two quadrants of the B-H plane, the output ripple is relatively large and a large output filtering inductor is required, which restricts the power density and efficiency.

For medium to large power applications, two-transistor forward converters are one of the most suitable topologies due to its simplicity and electrical performance. The transformer is excited only in the first quadrant of the B-H plane and the output current ripple is relatively large. Large transformer and output filtering inductors are required, which limits the power density and efficiency.

In order to reduce the size of the components and improve efficiency, integrated magnetic structures have been proposed for active clamp and two-transistor forward converters, wherein all transformer and inductor windings are wound on a single core.

U.S. Pat. No. 5,920,473 (Sturgeon) relates to dc-to-dc power converters with an integrated magnetic power transformer for continuously delivering controllable power to a load. A power transformer has a primary winding, two secondary windings and inductances in series with the primary winding and each of the two secondary windings. The primary and secondary windings are wound on a single magnetic core. The core includes a first leg and an oppositely disposed second leg, a third leg and an oppositely disposed fourth leg. Primary and secondary windings may be wound on one or two legs of the core, wherein the windings are wound spaced apart. An air-gap leg may be disposed between legs. The core may be in the form of a toroid.

Forward converters in the state of the art either require winding bobbins or core arrangements with pair of legs disposed opposed to each other. Winding bobbins lead to undesired losses, whereas disposing legs opposing each other requires complicated assembly steps. These cores are not flexible in term of mounting and of adjusting the magnetizing and filtering inductance through air gap. A single air gap is manufactured on the centre leg of an E/ER core by machine and bobbins are unavoidable to wind the coils. The single air gap, the winding bobbin, and the inflexible assembly affect negatively the costs, the power density, the power efficiency, and the thermal distribution. The winding bobbins and single air gap lead to high costs and cause more leakage as well as inductance losses.

SUMMARY OF THE INVENTION

It is the object of the invention to create a forward converter comprising a magnetic component pertaining to the technical field initially mentioned, that enables flexible assembly, while providing lower leakage, minimized copper power and inductance losses, as well as minimized overall thermal resistance.

According to one aspect of the invention, a forward converter comprising a magnetic component with a transformer and a filter output inductor includes an 8-shaped core with a first ring-shaped section and a second, at least partially bobbin-less ring-shaped section, wherein windings of the transformer are arranged on the first ring-shaped section and wherein windings of the filter output inductor are arranged directly on a bobbin-less part of the second ring-shaped section.

In typical embodiments, a first and a second U/UR core (the term "U/UR core" should be understood as "U core and/or UR core") are arranged to form an O-core, wherein windings of the transformer are arranged on the O-core, wherein a bobbin-less U/UR core is arranged to abut the O-core, and wherein windings of a filter output inductor, such as for example a smoothing inductor, are arranged directly on a body section of the bobbin-less U/UR core, or characterized in that windings of the transformer are arranged on a first section of an E/ER core, wherein windings of the filter output inductor are arranged directly on a second, bobbin-less section of the E/ER core.

In preferred embodiments, structures using bobbin-less U/UR cores or E/ER cores are provided, wherein windings are directly wound on the cores. U/UR cores have two legs and a body section connecting the two legs. E/ER cores have three legs, wherein a first body section is connecting an outer leg with the centre leg and a second body section is connecting the centre leg with the other outer leg. The windings may be wound on body sections of the U/UR cores or E/ER cores. The tight-core winding coupling yields lower leakage, minimized copper power and inductance losses, as well as minimized overall thermal resistance. Power density is increased and thermal resistance between core and winding is decreased. With the absence of bobbins, the costs are reduced. The U/UR cores are used as building blocks, which makes their assembly simpler and more flexible. Air gaps do not need to be ground and are inserted at connection points between the U/UR cores in order to adjust the reluctances and therefore the magnetizing and filtering inductances. Air gaps are distributed to provide mechanical stability, which yields reduced AC winding power losses and reduced inductance losses caused by air gap fringing fields. To avoid air gaps, cores of different materials such as for example ferrite or powder may be assembled, depending on whether low or high reluctance is required.

The windings of the transformer may be arranged on one or more winding bobbins, which may be arranged on the legs of the first and the second U/UR core. Hence, the transformer of the magnetic component may be built using widely available winding bobbins with appropriate windings.

Windings of the transformer may be arranged directly on body sections of the bobbin-less first and second U/UR core.

The tight coupling of the windings of the transformer yields lower leakage, minimized copper and inductance power losses, as well as minimized overall thermal resistance. Power density is increased and thermal resistance between core and winding is decreased. With the absence of bobbins, the costs are reduced.

An I-core may be arranged to abut the E/ER core in order to form a closed magnetic circuit. Together with the E/ER core, a relatively compact magnetic component is provided and the size of the forward converter is accordingly relatively compact.

A corresponding second E/ER core may be arranged to abut the E/ER core, wherein windings of the transformer may be arranged on a first section of the second E/ER core, and wherein windings of the filter output inductor may be arranged directly on a second, bobbin-less section of the second E/ER core. The forward converter may therefore include a symmetrically built magnetic component, which may lead to a simpler design.

One or more windings of the transformer and/or of the filter output inductor may be split in order to decrease stray inductance. Accordingly, efficiency of the forward converter is increased.

The transformer may include one primary winding and one secondary winding or the transformer may include a first and a second primary winding and one secondary winding. Depending on the desired application, a single transistor forward converter, a two-transistor forward converter, or an active clamp forward converter may be provided.

U/UR cores and/or E/ER cores may be formed substantially of high permeability, low saturation flux density material, wherein air gaps may be arranged in order to prevent core saturation, and/or U/UR cores and/or E/ER cores may be formed substantially of low permeability, low saturation flux density material, wherein air gaps may be eliminated accordingly. For example, ferrite cores may be located at low reluctance low saturation flux density areas, for example where energy transformation takes place, for example in the transformer area, and powder cores may be located at high saturation flux density areas, for example where energy storage takes place, for example in the filter output inductor area.

In the assembly of a forward converter comprising a magnetic component with a transformer and a filter output inductor, method steps may be performed in order to manufacture a forward converter according to the invention.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1A:
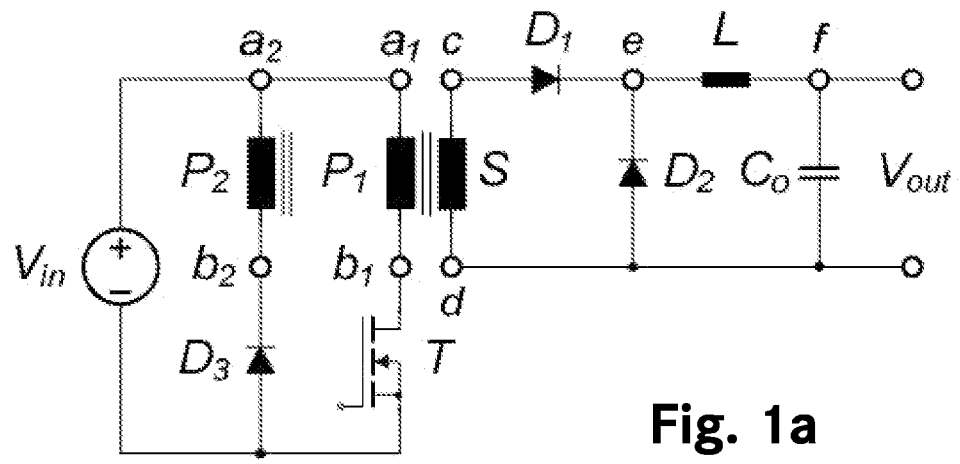
FIG. 1a-1c show embodiments of prior art forward converters.

FIG. 1a shows a prior art single transistor forward converter, which has a three winding transformer with a first primary winding $P_1$, a second primary winding $P_2$, and a secondary winding S. An input source $V_{in}$ is connected through transistor T to the first primary winding $P_1$ and through diode $D_3$ to the second primary winding $P_2$. The secondary winding S is connected through diode $D_1$ to diode $D_2$, and further connected to filter output inductor L and capacitor $C_o$ in order to provide the output voltage $V_{out}$.

Figure 1B:
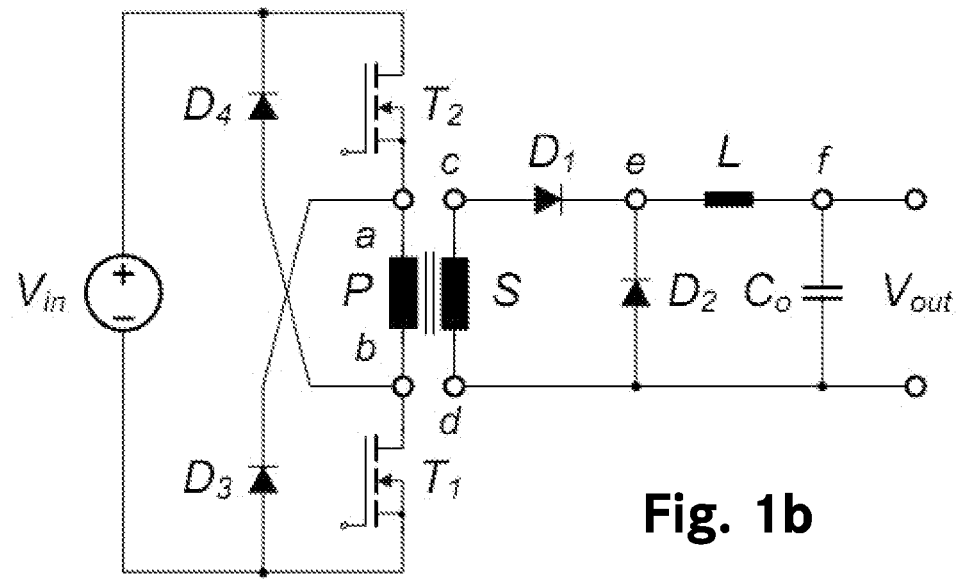

FIG. 1b shows a prior art two-transistor forward converter, which has a two winding transformer with a primary winding P and a secondary winding S. An input source $V_{in}$ is connected through two diodes $D_3$, $D_4$ and two transistors $T_1$, $T_2$ to the primary winding P. The secondary winding S is connected through diode $D_1$ to diode $D_2$, and further connected to filter output inductor L and capacitor $C_o$ in order to provide the output voltage $V_{out}$.

Figure 1C:
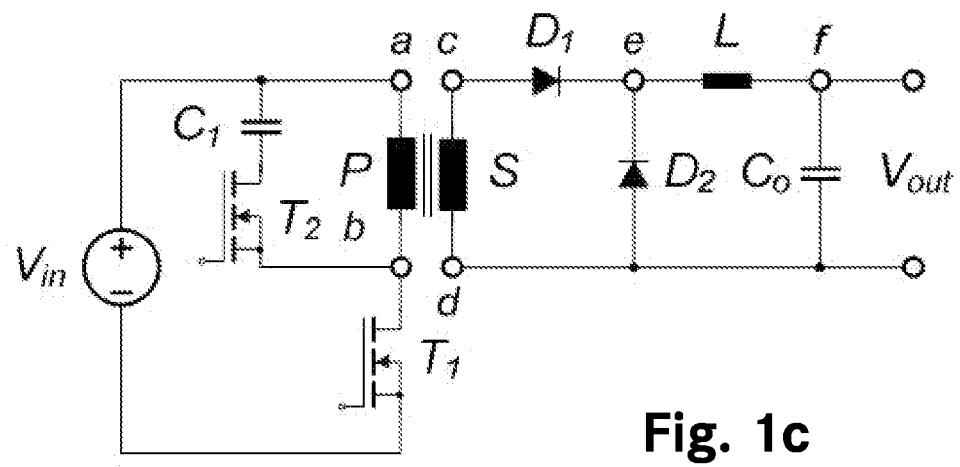

FIG. 1c shows a prior art active clamp forward converter, which has a two winding transformer with a primary winding P and a secondary winding S. An input source $V_{in}$ is connected through a first transistor $T_1$ to the primary winding P. A second transistor $T_2$ and a serially connected capacitor $C_1$ are connected in parallel to the primary winding P. The secondary winding S is connected through diode $D_1$ to diode $D_2$, and further connected to filter output inductor L and capacitor $C_o$ in order to provide the output voltage $V_{out}$.

Figure 2A:
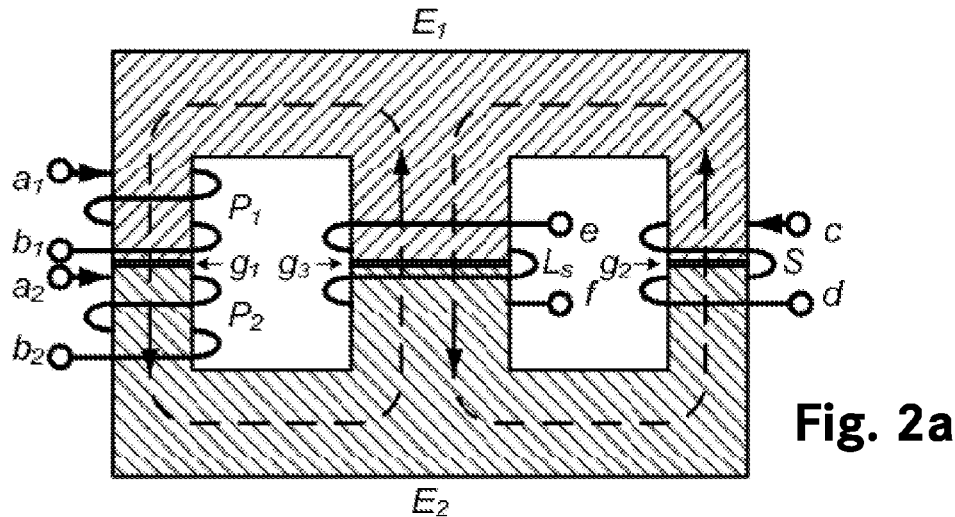
FIG. 2a-2c show embodiments of prior art magnetic components.

FIG. 2a shows a prior art magnetic component with a first E/ER core $E_1$ and a second E/ER core $E_2$, which are magnetically coupled. The magnetic component may be designed for use in a single transistor forward converter according to FIG. 1a, for example. An E/ER core includes three legs, namely two outer legs and a central leg, which are connected together through a first body section and a second body section. A first primary winding $P_1$ and a second primary winding $P_2$ are arranged on one of the outer legs of the first and second E/ER core $E_1$, $E_2$. A filter output inductor $L_s$ is arranged on the central legs of the first and second E/ER core $E_1$, $E_2$. A secondary winding S is arranged on the other outer legs of the first and second E/ER core $E_1$, $E_2$. As can be seen in FIG. 2a, windings are arranged on the legs of the E/ER cores close to gaps $g_1$, $g_2$, $g_3$ between the first E/ER core $E_1$ and the second E/ER core $E_2$. The windings are arranged on winding bobbins (not shown in FIG. 2a), because only windings wound on a winding bobbin provide the mechanical stability required when arranged at such a location.

Figure 2B:
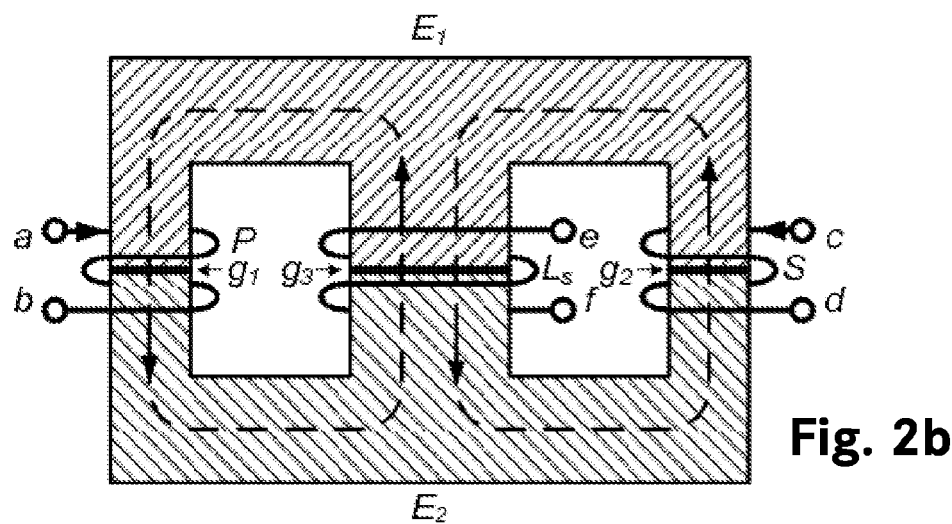

FIG. 2b shows a prior art magnetic component with a first E/ER core $E_1$ and a second E/ER core $E_2$, which are magnetically coupled. The magnetic component may be designed for use in a two-transistor forward converter according to FIG. 1b or in an active clamp forward converter according to FIG. 1c, for example. A primary winding P is arranged on one of the outer legs of the first and second E/ER core $E_1$, $E_2$ and a secondary winding S is arranged on the other outer legs of the first and second E/ER core $E_1$, $E_2$. A filter output inductor $L_s$ is arranged on the central legs of the first and second E/ER core $E_1$, $E_2$. The windings are arranged close to gaps $g_1$, $g_2$, $g_3$ between the first E/ER core $E_1$ and the second E/ER core $E_2$. The windings are arranged on winding bobbins (not shown in FIG. 2b).

Figure 2C:
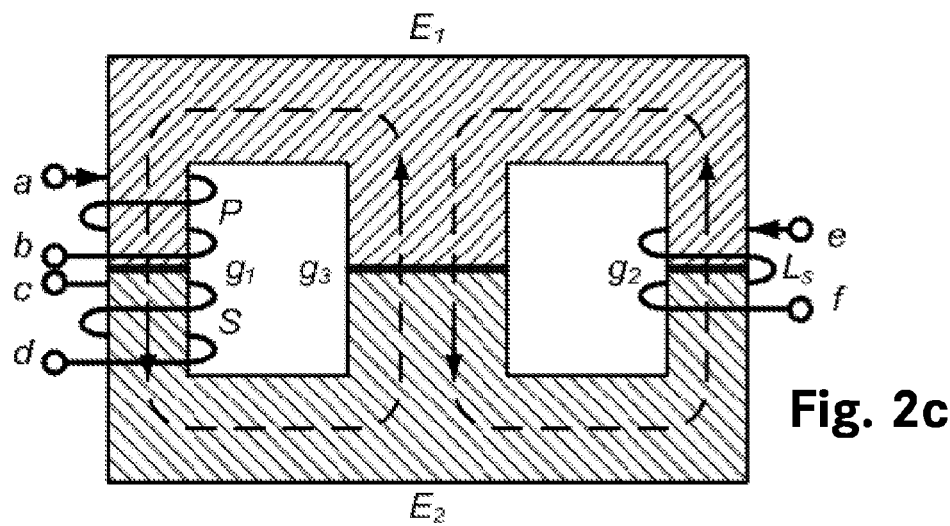

FIG. 2c shows a prior art magnetic component with a first E/ER core $E_1$ and a second E/ER core $E_2$, which are magnetically coupled. The magnetic component may be designed for use in a two-transistor forward converter according to FIG. 1b or in an active clamp forward converter according to FIG. 1c, for example. A primary winding P and a secondary winding S are arranged on one of the outer legs of the first and second E/ER core $E_1$, $E_2$ and a filter output inductor $L_s$ is arranged on the other outer legs of the first and second E/ER core $E_1$, $E_2$. The windings are arranged close to gaps $g_1$, $g_2$, $g_3$ between the first E/ER core $E_1$ and the second E/ER core $E_2$. The windings are arranged on winding bobbins (not shown in FIG. 2c).

Figure 3A:
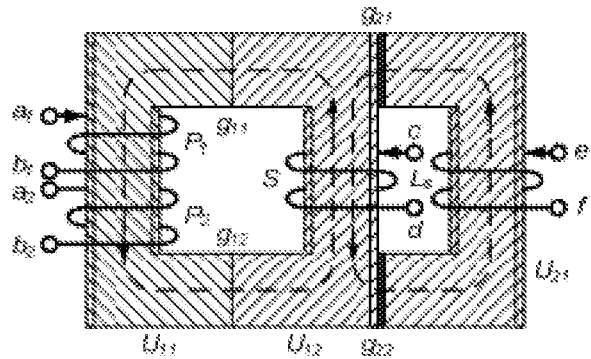
FIG. 3a-3d show first embodiments of magnetic components according to the invention.

FIG. 3a shows a magnetic component according to an embodiment of the invention with a first U/UR core $U_{11}$, a second U/UR core $U_{12}$, and a third U/UR core $U_{21}$. A U/UR core has two legs, which are connected together through a body section. The first U/UR core $U_{11}$ and the second U/UR core $U_{12}$ are magnetically coupled through gaps $g_{11}$, $g_{12}$, wherein the legs of the U/UR cores abut each other and form an O-core. The third U/UR core $U_{21}$ is magnetically coupled through gaps $g_{21}$, $g_{22}$ to the second U/UR core $U_{12}$, wherein the legs of the third U/UR core $U_{21}$ abut the body section of the second U/UR core $U_{21}$. A first primary winding $P_1$ and a second primary winding $P_2$ are arranged on the body section of the first U/UR core $U_{11}$. A secondary winding S is arranged on the body section of the second U/UR core $U_{12}$. A filter output inductor $L_s$ is arranged on the body section of the third U/UR core $U_{21}$. The windings are arranged bobbin-less on the U/UR cores. The U/UR cores are formed entirely of high permeability material, wherein the air gaps $g_{11}$, $g_{12}$, $g_{21}$, $g_{22}$ prevent saturation.

Figure 3B:
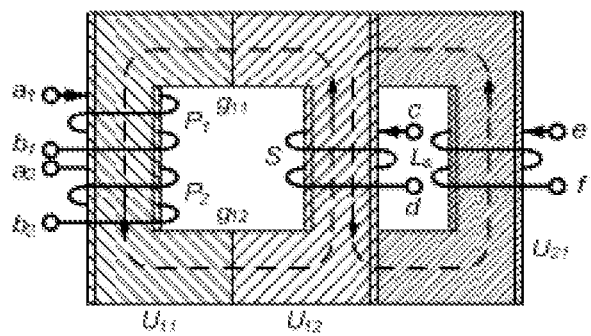

FIG. 3b shows a magnetic component according to another embodiment of the invention, wherein contrarily to the embodiment shown in FIG. 3a the third U/UR core $U_{21}$ is formed of low permeability, high saturation flux density material and no air gaps are provided between the third U/UR core $U_{21}$ and the second U/UR core $U_{12}$.

Figure 3C:
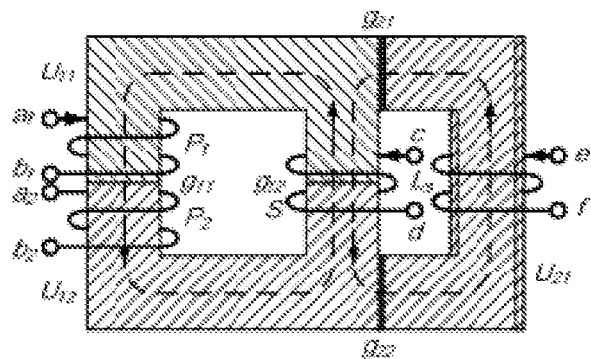

FIG. 3c shows a magnetic component according to another embodiment of the invention, wherein contrarily to the embodiment shown in FIG. 3a windings are arranged on winding bobbins on the legs of the first and second U/UR core $U_{11}$, $U_{12}$. Accordingly, the third U/UR core $U_{21}$ abuts the legs of the first and the second U/UR core $U_{11}$, $U_{12}$. In other words, the first and the second U/UR core $U_{11}$, $U_{12}$ are rotated by 90° with respect to FIG. 3a, wherein the location of the windings is not rotated. The filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 3D:
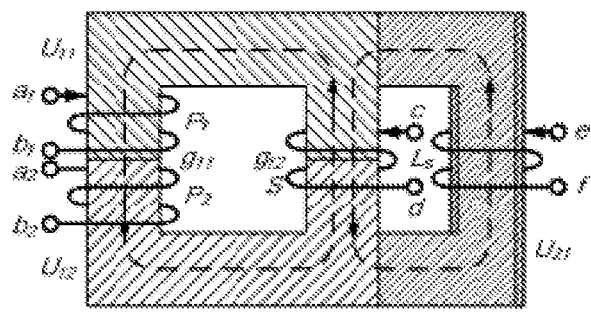

FIG. 3d shows a magnetic component according to another embodiment of the invention, wherein contrarily to the embodiment shown in FIG. 3c the third U/UR core $U_{21}$ is formed of low permeability, high saturation flux density material and no air gaps are provided between the third U/UR core $U_{21}$ and the first and the second U/UR core $U_{11}$, $U_{12}$.

The magnetic components shown in FIG. 3a-3d may be designed for use in a single transistor forward converter according to FIG. 1a, for example.

Figure 4A:
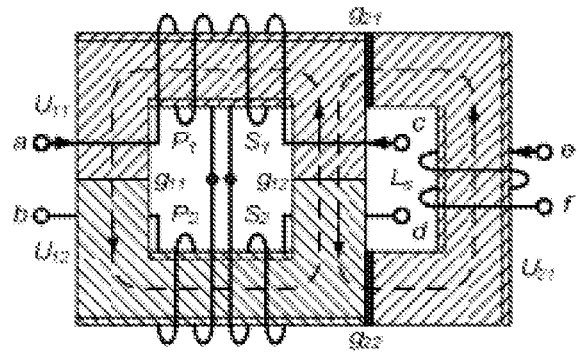
FIG. 4a-4d show second embodiments of magnetic components according to the invention.

FIG. 4a shows a magnetic component according to another embodiment of the invention, with a first U/UR core $U_{11}$, a second U/UR core $U_{12}$, and a third U/UR core $U_{21}$. The first U/UR core $U_{11}$ and the second U/UR core $U_{12}$ are magnetically coupled through gaps $g_{11}$, $g_{12}$, wherein the legs of the U/UR cores abut each other and form an O-core. The third U/UR core $U_{21}$ is magnetically coupled through gaps $g_{21}$, $g_{22}$ to the first and the second U/UR core $U_{11}$, $U_{12}$ wherein the legs of the third U/UR core $U_{21}$ abut the legs of the first and the second U/UR core $U_{11}$, $U_{12}$. A first primary winding $P_1$ and a first secondary winding $S_1$ are arranged bobbin-less on the body section of the first U/UR core $U_{11}$. A second primary winding $P_2$ and a second secondary winding $S_2$ are arranged bobbin-less on the body section of the second U/UR core $U_{12}$. The first primary winding $P_1$ may be connected to the second primary winding $P_2$, wherein a primary winding may be formed, and the first secondary winding $S_1$ may be connected to the second secondary winding $S_2$, wherein a secondary winding may be formed. A filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 4B:
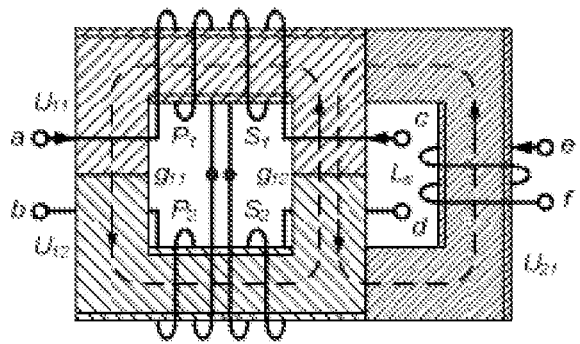

FIG. 4b shows a magnetic component according to another embodiment of the invention, wherein contrarily to the embodiment shown in FIG. 4a the third U/UR core $U_{21}$ is formed of low permeability, high saturation flux density material and no air gaps are provided between the third U/UR core $U_{21}$ and the first and the second U/UR core $U_{11}$, $U_{12}$.

Figure 4C:
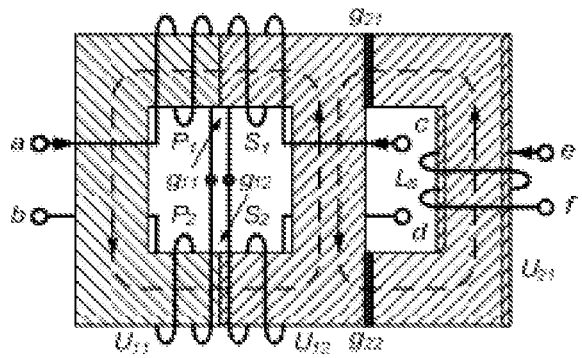

FIG. 4c shows a magnetic component according to another embodiment of the invention, wherein contrarily to the embodiment shown in FIG. 4a windings are arranged on winding bobbins on the legs of the first and second U/UR core $U_{11}$, $U_{12}$. Accordingly, the third U/UR core $U_{21}$ abuts the body section of the second U/UR core $U_{12}$. In other words, the first and the second U/UR core $U_{11}$, $U_{12}$ are rotated by 90° with respect to FIG. 4a, wherein the location of the windings is not rotated. The filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 4D:
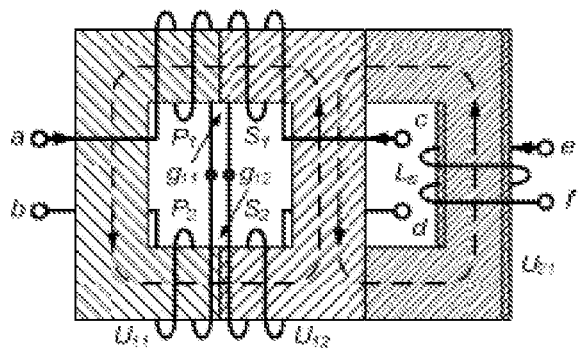

FIG. 4d shows a magnetic component according to another embodiment of the invention, wherein contrarily to the embodiment shown in FIG. 4c the third U/UR core $U_{21}$ is formed of low permeability, high saturation flux density material and no air gaps are provided between the third U/UR core $U_{21}$ and the second U/UR core $U_{12}$.

The magnetic components shown in FIG. 4a-4d may be designed for use in a two-transistor forward converter according to FIG. 1b or in an active clamp forward converter according to FIG. 1c, for example.

Figure 5A:
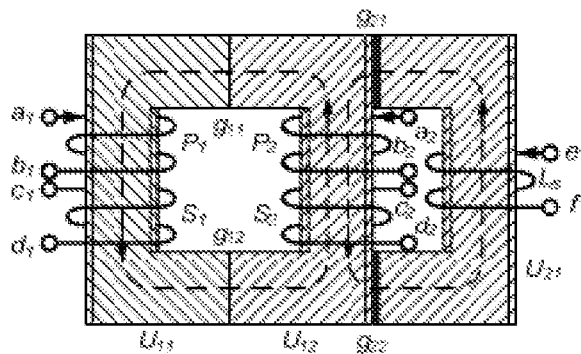
FIG. 5a-5d show third embodiments of magnetic components according to the invention.

FIG. 5a shows a magnetic component according to an embodiment of the invention with a first U/UR core $U_{11}$, a second U/UR core $U_{12}$, and a third U/UR core $U_{21}$. The first U/UR core $U_{11}$ and the second U/UR core $U_{12}$ are magnetically coupled through gaps $g_{11}$, $g_{12}$, wherein the legs of the U/UR cores abut each other and form an O-core. The third U/UR core $U_{21}$ is magnetically coupled through gaps $g_{21}$, $g_{22}$ to the second U/UR core $U_{12}$, wherein the legs of the third U/UR core $U_{21}$ abut the body section of the second U/UR core $U_{21}$. A first primary winding $P_1$ and a first secondary winding $S_1$ are arranged bobbin-less on the body section of the first U/UR core $U_{11}$. A second primary winding $P_2$ and a second secondary winding $S_2$ are arranged bobbin-less on the body section of the second U/UR core $U_{12}$. The first primary winding $P_1$ may be connected to the second primary winding $P_2$, wherein a primary winding may be formed, and the first secondary winding $S_1$ may be connected to the second secondary winding $S_2$, wherein a secondary winding may be formed. A filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 5B:
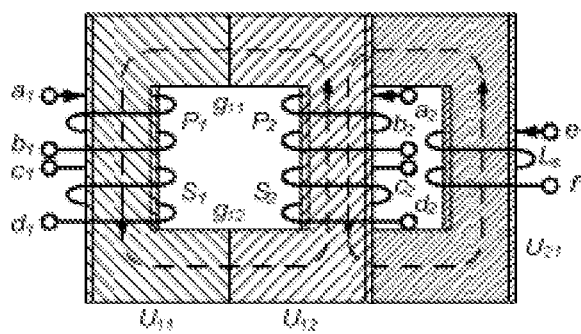

FIG. 5b shows a magnetic component according to another embodiment of the invention, wherein contrarily to the embodiment shown in FIG. 5a the third U/UR core $U_{21}$ is formed of low permeability, high saturation flux density material and no air gaps are provided between the third U/UR core $U_{21}$ and the second U/UR core $U_{12}$.

Figure 5C:
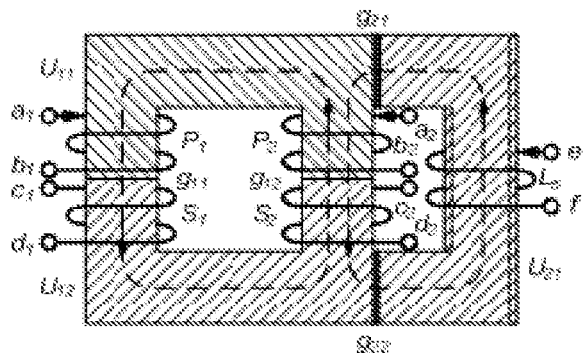

FIG. 5c shows a magnetic component according to another embodiment of the invention, wherein contrarily to the embodiment shown in FIG. 5a windings are arranged on winding bobbins on the legs of the first and second U/UR core $U_{11}$, $U_{12}$. Accordingly, the third U/UR core $U_{21}$ abuts the legs of the first and the second U/UR core $U_{11}$, $U_{12}$. In other words, the first and the second U/UR core $U_{11}$, $U_{12}$ are rotated by 90° with respect to FIG. 5a, wherein the location of the windings is not rotated. The filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 5D:
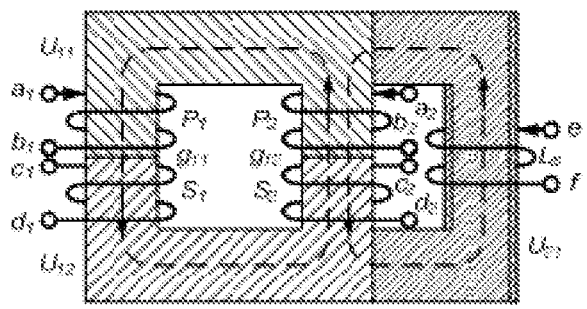

FIG. 5d shows a magnetic component according to another embodiment of the invention, wherein contrarily to the embodiment shown in FIG. 5c the third U/UR core $U_{21}$ is formed of low permeability, high saturation flux density material and no air gaps are provided between the third U/UR core $U_{21}$ and the first and the second U/UR core $U_{11}$, $U_{12}$.

The magnetic components shown in FIG. 5a-5d may be designed for use in a two-transistor forward converter according to FIG. 1b or in an active clamp forward converter according to FIG. 1c, for example.

Figure 6A:
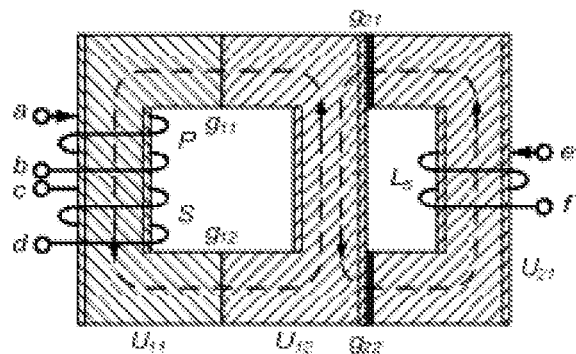
FIG. 6a-6d show fourth embodiments of magnetic components according to the invention.

FIG. 6a shows a magnetic component according to an embodiment of the invention with a first U/UR core $U_{11}$, a second U/UR core $U_{12}$, and a third U/UR core $U_{21}$. The first U/UR core $U_{11}$ and the second U/UR core $U_{12}$ are magnetically coupled through gaps $g_{11}$, $g_{12}$, wherein the legs of the U/UR cores abut each other and form an O-core. The third U/UR core $U_{21}$ is magnetically coupled through gaps $g_{21}$, $g_{22}$ to the second U/UR core $U_{12}$, wherein the legs of the third U/UR core $U_{21}$ abut the body section of the second U/UR core $U_{21}$. A primary winding P and a secondary winding S are arranged bobbin-less on the body section of the first U/UR core $U_{11}$. A filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 6B:
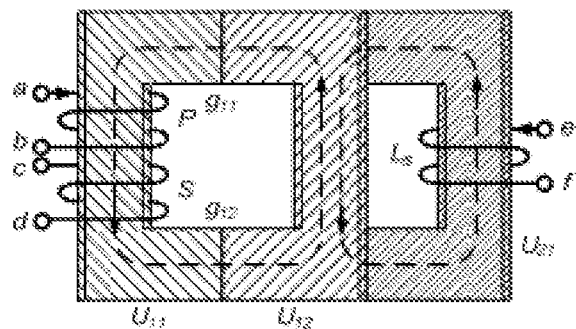

FIG. 6b shows a magnetic component according to another embodiment of the invention, wherein contrarily to the embodiment shown in FIG. 6a the third U/UR core $U_{21}$ is formed of low permeability, high saturation flux density material and no air gaps are provided between the third U/UR core $U_{21}$ and the second U/UR core $U_{12}$.

Figure 6C:
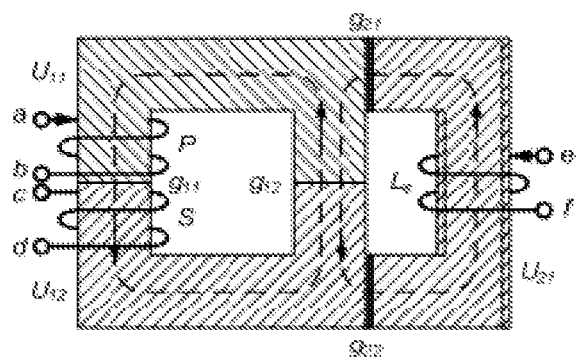

FIG. 6c shows a magnetic component according to another embodiment of the invention, wherein contrarily to the embodiment shown in FIG. 6a windings are arranged on winding bobbins on the legs of the first and second U/UR core $U_{11}$, $U_{12}$. Accordingly, the third U/UR core $U_{21}$ abuts the legs of the first and the second U/UR core $U_{11}$, $U_{12}$. In other words, the first and the second U/UR core $U_{11}$, $U_{12}$ are rotated by 90° with respect to FIG. 6a, wherein the location of the windings is not rotated. The filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 6D:
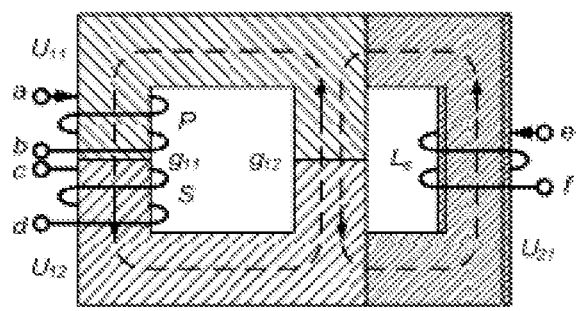

FIG. 6d shows a magnetic component according to another embodiment of the invention, wherein contrarily to the embodiment shown in FIG. 6c the third U/UR core $U_{21}$ is formed of low permeability, high saturation flux density material and no air gaps are provided between the third U/UR core $U_{21}$ and the first and the second U/UR core $U_{11}$, $U_{12}$.

The magnetic components shown in FIG. 6a-6d may be designed for use in a two-transistor forward converter according to FIG. 1b or in an active clamp forward converter according to FIG. 1c, for example.

Figure 7A:
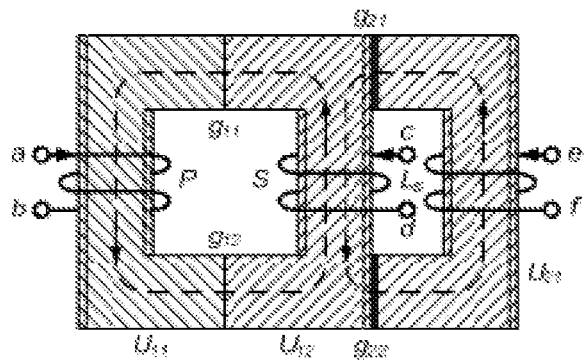
FIG. 7a-7d show fifth embodiments of magnetic components according to the invention.

FIG. 7a shows a magnetic component according to an embodiment of the invention with a first U/UR core $U_{11}$, a second U/UR core $U_{12}$, and a third U/UR core $U_{21}$. The first U/UR core $U_{11}$ and the second U/UR core $U_{12}$ are magnetically coupled through gaps $g_{11}$, $g_{12}$, wherein the legs of the U/UR cores abut each other and form an O-core. The third U/UR core $U_{21}$ is magnetically coupled through gaps $g_{21}$, $g_{22}$ to the second U/UR core $U_{12}$, wherein the legs of the third U/UR core $U_{21}$ abut the body section of the second U/UR core $U_{21}$. A primary winding P is arranged bobbin-less on the body section of the first U/UR core $U_{11}$. A secondary winding S is arranged bobbin-less on the body section of the second U/UR core $U_{12}$. A filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 7B:
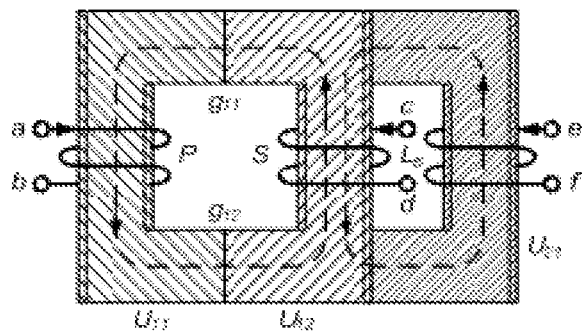

FIG. 7b shows a magnetic component according to another embodiment of the invention, wherein contrarily to the embodiment shown in FIG. 7a the third U/UR core $U_{21}$ is formed of low permeability, high saturation flux density material and no air gaps are provided between the third U/UR core $U_{21}$ and the second U/UR core $U_{12}$.

Figure 7C:
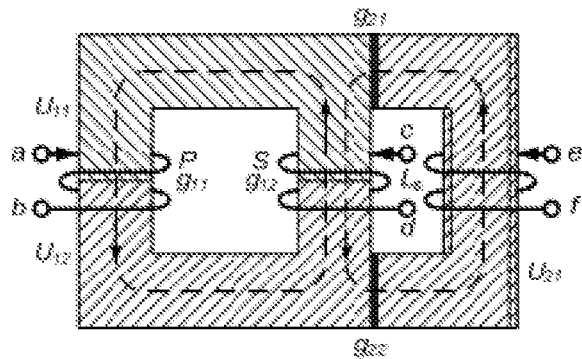

FIG. 7c shows a magnetic component according to another embodiment of the invention, wherein contrarily to the embodiment shown in FIG. 7a windings are arranged on winding bobbins on the legs of the first and second U/UR core $U_{11}$, $U_{12}$. Accordingly, the third U/UR core $U_{21}$ abuts the legs of the first and the second U/UR core $U_{11}$, $U_{12}$. In other words, the first and the second U/UR core $U_{11}$, $U_{12}$ are rotated by 90° with respect to FIG. 7a, wherein the location of the windings is not rotated. The filter inductor winding $L_s$ is arranged bobbin-less on the third U/UR cores $U_{21}$. The U/UR cores are formed entirely of high permeability material, wherein the air gaps $g_{11}$, $g_{12}$, $g_{21}$, $g_{22}$ prevent saturation.

Figure 7D:
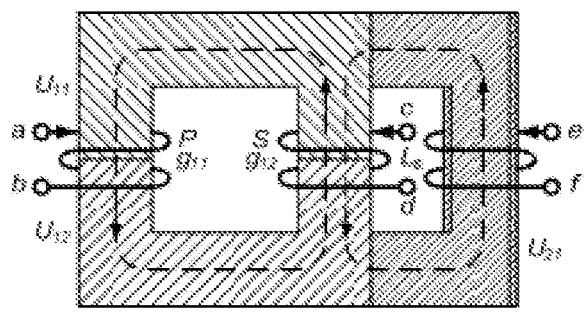

FIG. 7d shows a magnetic component according to another embodiment of the invention, wherein contrarily to the embodiment shown in FIG. 7c the third U/UR core $U_{21}$ is formed of low permeability, high saturation flux density material and no air gaps are provided between the third U/UR core $U_{21}$ and the first and the second U/UR core $U_{11}$, $U_{12}$.

The magnetic components shown in FIG. 7a-7d may be designed for use in a two-transistor forward converter according to FIG. 1b or in an active clamp forward converter according to FIG. 1c, for example.

Figure 8:
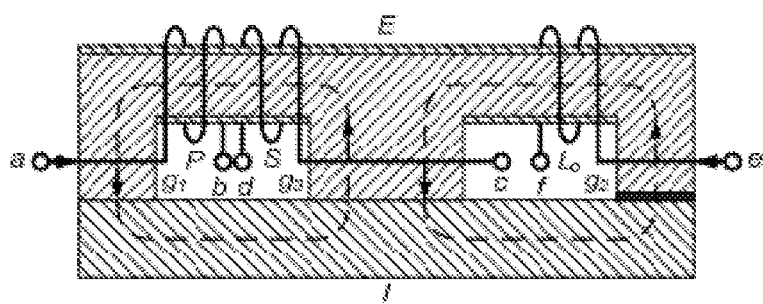
FIG. 8 shows a sixth embodiment of magnetic components according to the invention.

FIG. 8 shows a magnetic component according to another embodiment of the invention, wherein an E/ER core E is magnetically coupled through gaps $g_1$, $g_2$, $g_3$ to an I-core I. The E/ER core E has three legs, which are connected together through a first body section and second body section. A primary winding P is arranged bobbin-less on the first body section of the E/ER core E. A secondary winding S is arranged bobbin-less on the second body section of the E/ER core E. An output filter winding $L_o$ is arranged bobbin-less on the second body section of the E/ER core E. The E/ER core and the I-core are formed entirely of high permeability material, wherein the air gaps $g_{11}$, $g_{12}$, $g_{21}$, $g_{22}$ prevent saturation.

The magnetic component shown in FIG. 8 may be designed for use in a two-transistor forward converter according to FIG. 1b or in an active clamp forward converter according to FIG. 1c, for example.

Figure 9:
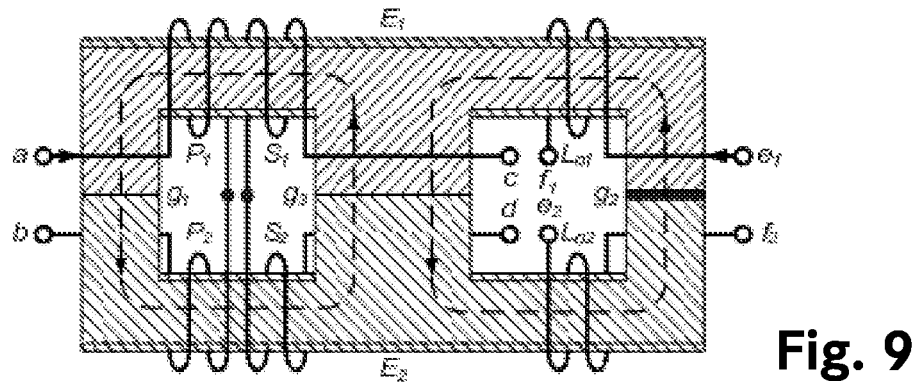
FIG. 9 shows a seventh embodiment of magnetic components according to the invention.

FIG. 9 shows a magnetic component according to another embodiment of the invention, wherein a first E/ER core $E_1$ is magnetically coupled through gaps $g_1$, $g_2$, $g_3$ to a second E/ER core $E_2$. A first primary winding $P_1$ and a first secondary winding $S_1$ are arranged on a first body section of the first E/ER core $E_1$. A second primary winding $P_2$ and a second secondary winding $S_2$ are arranged on a first body section of the second E/ER core $E_2$. The first primary winding $P_1$ may be connected to the second primary winding $P_2$ and the first secondary winding $S_1$ may be connected to the second secondary winding $S_2$. A first output filter winding $L_{o1}$ is arranged on a second body section of the first E/ER core $E_1$. A second output filter winding $L_{o2}$ is arranged on a second body section of the second E/ER core $E_2$. The first output filter winding $L_{o1}$ may be connected to the second output filter winding $L_{o2}$. The E/ER cores $E_1$, $E_2$ are formed entirely of high permeability material, wherein the air gaps $g_{11}$, $g_{12}$, $g_{21}$, $g_{22}$ prevent saturation.

The magnetic component shown in FIG. 9 may be designed for use in a two-transistor forward converter according to FIG. 1b or in an active clamp forward converter according to FIG. 1c, for example.

The high permeability material may include completely ferrite cores. The low permeability, high saturation flux density material may include composite ferrite and powder cores.

The invention claimed is:

1. Forward converter comprising:
a magnetic component with a transformer and a filter output inductor,
wherein
the forward converter includes an 8-shaped core with a first ring-shaped section and a second, at least partially bobbin-less ring-shaped section, wherein windings of the transformer are arranged on the first ring-shaped section and wherein windings of the filter output inductor are arranged directly on a bobbin-less part of the second ring-shaped section.

2. Forward converter according to claim 1, wherein a first and a second U/UR core are arranged to form the first ring-shaped section as an O-core and wherein a bobbin-less U/UR core is arranged to abut the O-core in order to form the second ring-shaped section.

3. Forward converter according to claim 1, wherein an I-core is arranged to abut an E/ER core in order to form the 8-shaped core.

4. Forward converter according to claim 1, wherein a first E/ER core and a second E/ER core are arranged to form the 8-shaped core.

5. Forward converter according to claim 2, wherein windings of the transformer are arranged on one or more winding bobbins, which are arranged on legs of the first and the second U/UR core.

6. Forward converter according to claim 2, wherein windings of the transformer are arranged directly on body sections of the bobbin-less first and second U/UR core.

7. Forward converter according to claim 3, wherein the I-core and the E/ER core form a closed magnetic circuit.

8. Forward converter according to claim 4, wherein windings of the transformer are arranged on a first section of the second E/ER core, and wherein windings of the filter output inductor are arranged directly on a second, bobbin-less section of the second E/ER core.

9. Forward converter according to claim 1, wherein one or more windings of the transformer and/or of the filter output inductor are split in order to decrease stray inductance.

10. Forward converter according to claim 1, wherein the transformer includes one primary winding and one secondary winding or that the transformer includes a first and a second primary winding and one secondary winding.

11. Forward converter according to claim 2, wherein the U/UR cores and/or E/ER cores are formed substantially of high permeability, low saturation flux density material, wherein air gaps are arranged in order to prevent core saturation, and/or wherein U/UR cores and/or E/ER cores are formed substantially of low permeability, low saturation flux density material, wherein air gaps for U/UR or for E/ER are eliminated accordingly.

12. A method for forming a magnetic component with a transformer and a filter output inductor for a forward converter, the method comprising:
arranging a first ring-shaped section and a second, at least partially bobbin-less ring-shaped section to form an 8-shaped core;
arranging windings of the transformer on the first ring-shaped section; and
arranging windings of the filter output inductor directly on a bobbin-less part of the second ring-shaped section.

13. The method according to claim 12, further comprising: arranging a first and a second U/UR core to form an O-core, arranging windings of the transformer on the O-core, arranging a bobbin-less U/UR core to abut the O-core and to thus form the 8-shaped core, and arranging windings of the filter output inductor on the bobbin-less U/UR core.

14. The method according to claim 12, further comprising: arranging windings of the transformer on a first section of an E/ER core, and arranging windings of the filter output inductor directly on a second, bobbin-less section of the E/ER core.

15. The method according to claim 13, further comprising: arranging windings of the transformer on one or more winding bobbins, and arranging the winding bobbins on the legs of the first and the second U/UR core.

16. The method according to claim 13, further comprising: arranging windings of the transformer directly on body sections of the bobbin-less first and second U/UR core.

17. The method according to claim 12, further comprising: arranging an I-core to abut an E/ER core in order to form the 8-shaped core and/or in order to form a magnetic circuit.

18. The method according to claim 14, further comprising: arranging a corresponding second E/ER core to abut the E/ER core, arranging windings of the transformer on a first section of the second E/ER core, and arranging windings of the filter output inductor directly on a second, bobbin-less section of the second E/ER core.

19. The method according to claim 12, further comprising: splitting one or more windings of the transformer and/or the filter output inductor in order to decrease stray inductance.

20. The method according to claim 13, further comprising: arranging U/UR cores and/or E/ER cores formed substantially of high permeability, low saturation flux density material, and arranging air gaps in order to prevent core saturation, and/or arranging U/UR cores and/or E/ER cores formed substantially of low permeability, low saturation flux density material, wherein air gaps are eliminated accordingly.

* * * * *